(12) United States Patent
Shima et al.

(10) Patent No.: US 10,353,398 B2
(45) Date of Patent: Jul. 16, 2019

(54) MOVING OBJECT DETECTION DEVICE, PROGRAM, AND RECORDING MEDIUM

(71) Applicant: Panasonic Intellectual Property Management Co., Ltd., Osaka (JP)

(72) Inventors: Takahiro Shima, Kanagawa (JP); Hirofumi Nishimura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/597,730

(22) Filed: May 17, 2017

(65) Prior Publication Data

US 2017/0344022 A1 Nov. 30, 2017

(30) Foreign Application Priority Data

May 31, 2016 (JP) ................................. 2016-109390

(51) Int. Cl.
| | | |
|---|---|---|
| G05D 1/02 | (2006.01) |
| G01S 7/41 | (2006.01) |
| G01S 13/56 | (2006.01) |
| G01S 13/93 | (2006.01) |
| G01S 17/02 | (2006.01) |
| G01S 17/93 | (2006.01) |

(52) U.S. Cl.
CPC ............ *G05D 1/0257* (2013.01); *G01S 7/415* (2013.01); *G01S 13/56* (2013.01); *G01S 13/931* (2013.01); *G01S 17/026* (2013.01); *G01S 17/936* (2013.01); *G05D 1/0231* (2013.01)

(58) Field of Classification Search
USPC ....................................................... 701/301
See application file for complete search history.

(56) References Cited

U.S. PATENT DOCUMENTS

| | | | | |
|---|---|---|---|---|
| 2007/0276600 A1* | 11/2007 | King | ..................... | G08G 1/042 701/301 |
| 2010/0185411 A1* | 7/2010 | Pfeiffer | .................... | G08G 1/01 702/150 |
| 2011/0301845 A1* | 12/2011 | Harada | ............... | B60R 21/0134 701/301 |

(Continued)

FOREIGN PATENT DOCUMENTS

JP 2009-192430 A 8/2009

OTHER PUBLICATIONS

Extended European Search Report, dated Nov. 24, 2017, for the corresponding European Patent Application No. 17170821.7-1812, 10 pages.

*Primary Examiner* — Tyler D Paige
(74) *Attorney, Agent, or Firm* — Seed IP Law Group LLP

(57) ABSTRACT

The present disclosure provides a moving object detection device including a first input circuitry that receives positional information indicating a position of an object present around a vehicle in time sequence from an object detector included in the vehicle, and a controller that processes the positional information received by the first input circuitry in time sequence, detects at least a first continuum along a traveling road of the vehicle, and when a shape of a detected first continuum of this time is changed in comparison with a shape of a previous first continuum, outputs information indicating that another moving object different from the vehicle is present to a vehicle control circuitry of the vehicle.

8 Claims, 15 Drawing Sheets

(56) References Cited

U.S. PATENT DOCUMENTS

| | | | |
|---|---|---|---|
| 2012/0176864 A1* | 7/2012 | Karl | G01S 7/539 367/89 |
| 2013/0033368 A1 | 2/2013 | Fukamachi | |
| 2015/0334269 A1 | 11/2015 | Yokota et al. | |
| 2015/0353078 A1* | 12/2015 | Kaminade | G01S 13/06 701/1 |
| 2016/0001781 A1* | 1/2016 | Fung | B60W 40/08 701/36 |
| 2016/0202355 A1* | 7/2016 | Liu | G01S 7/41 342/70 |
| 2016/0231746 A1* | 8/2016 | Hazelton | G05D 1/0257 |
| 2017/0372150 A1* | 12/2017 | Mayser | B60W 30/0956 |

* cited by examiner

MOVING OBJECT DETECTION DEVICE, PROGRAM, AND RECORDING MEDIUM

BACKGROUND

1. Technical Field

The present disclosure relates to a moving object detection device, a program, and a recording medium for detecting a moving object on the basis of a detection result of an object detector.

2. Description of the Related Art

A conventional one of such moving object detection devices is for example, an object type determination device disclosed in Japanese Patent No. 4753053. The object type determination device determines the presence or absence of a characteristic firstly, which indicates a vehicle, on the basis of the detection result of a millimeter wave radar and when heat is sensed through an infrared camera at tail light or headlight part, determines that it is a vehicle.

The conventional object type determination device further continues the determination process of a vehicle when the detection result of the millimeter wave radar includes a characteristic of two straight lines having an intersection point, that is, a characteristic formed by a front face and a side face of a rectangular parallelepiped. Depending on the position of the vehicle to be detected, however, the millimeter wave radar may detect only one face of the vehicle. In this case, the conventional object type determination device fails to detect the above-described characteristic from the detection result of the millimeter wave radar. In other words, there has been an issue that conventional object type determination devices may fail to determine moving objects suitably.

SUMMARY

One non-limiting and exemplary embodiment facilitates providing a moving object detection device, a program, and a recording medium, which enable a moving object to be detected more stably.

In one general aspect, the techniques disclosed here feature a moving object detection device including a first input circuitry that receives positional information indicating a position of an object present around a vehicle in time sequence from an object detector included in the vehicle, and a controller that processes the positional information received by the first input circuitry in time sequence, detects at least a first continuum along a traveling road of the vehicle, and when a shape of a detected first continuum of this time is changed in comparison with a shape of a previous first continuum, outputs information indicating that another moving object different from the vehicle is present to a vehicle control circuitry of the vehicle.

The present disclosure can facilitate providing a moving object detection device, a program, and a recording medium, which enable a moving object to be detected more stably.

It should be noted that general or specific embodiments may be implemented as a system, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
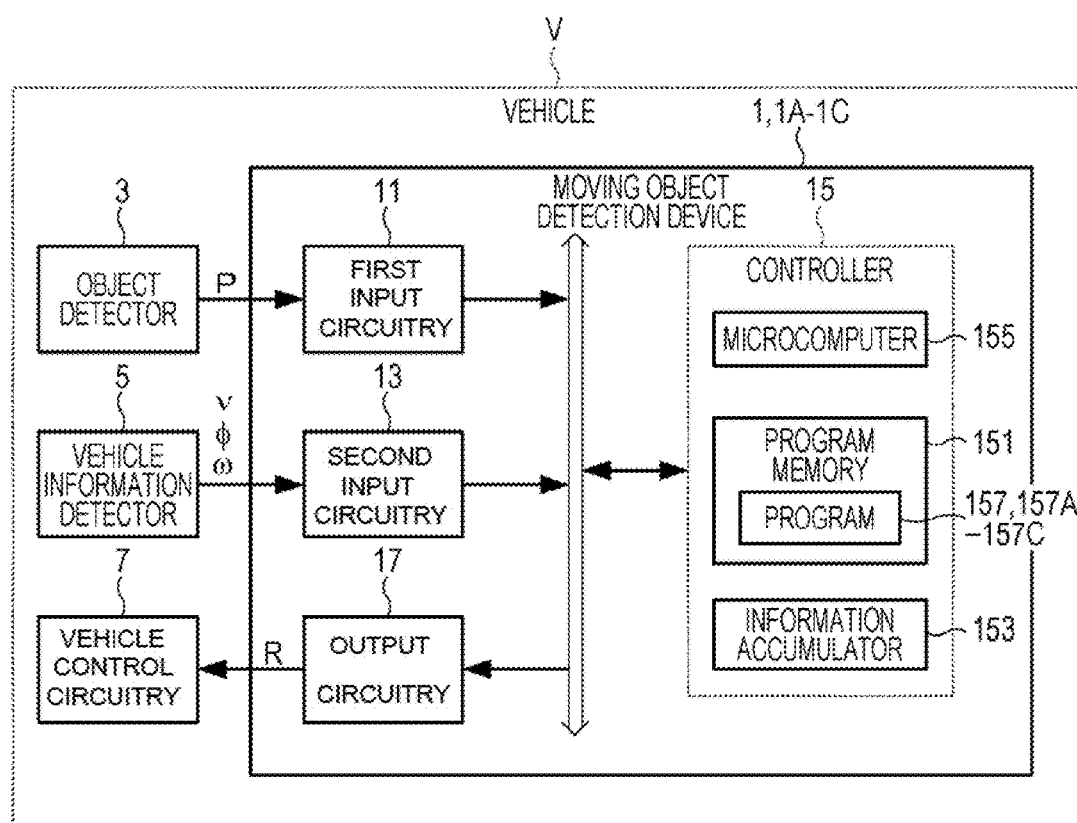
FIG. 1 illustrates a hardware configuration of a moving object detection device according to the present disclosure.

Moving object detection devices 1 and 1A to 1C, a program 157, and a recording medium that stores the program 157 according to the present disclosure are described below by referring to the above-listed drawings.

1. Definition

In the drawings, the x axis and the y axis indicate the width direction and the length direction of a vehicle V, respectively. It is assumed that an origin point O of both the axes corresponds to the position at which an object detector 3 is arranged when the vehicle V is at a current position. In the present disclosure, it is assumed that the y axis indicates positive values in the traveling direction of the vehicle V on the basis of the origin point O and the x axis indicates positive values in a rightward direction relative to the traveling direction of the vehicle V that travels in a positive direction of the y axis.

An area C is an intersection for example, where the vehicle V is movable. The area C may be a bend, in particular a sharp turn, in a road.

2. Embodiments

The moving object detection device 1 according to an embodiment of the present disclosure is described below.
<2-1. Structures of Moving Object Detection Device 1 and Periphery Thereof>

In FIG. 1, in addition to the above-described the moving object detection device 1, the vehicle V includes the object detector 3, a vehicle information detector 5, and a vehicle control circuitry 7.

First, the object detector 3 and the vehicle information detector 5 are described.

For example, the object detector 3 is a sensor, such as a laser radar or a millimeter wave radar, and is arranged in the proximity of a front end of the vehicle V. For example, while performing scanning at predetermined angular steps within a measurable range of the object detector 3, in other words, within the view thereof, the object detector 3 emits a radar signal for each azimuth defined as each angular step from a transmission antenna.

The object detector 3 receives a reflection signal (a return signal) for the emitted radar signal at a reception antenna and for example, on the basis of a time-of-flight (TOF) scheme, derives a spatial distance to what exists in the measurement range at each azimuth, which may not only be a moving object but may also be a wall, a tree, a sign, or the like to generate positional information P, which includes each azimuth within the measurement range and a spatial distance corresponding to each azimuth, for one frame.

Radar signals are regularly emitted so that the positional information P is generated by the object detector 3 in time sequence, specifically in each frame period Tf. The positional information P may include the relative speed of an object, which a transmitted radar signal hits and on which the signal is reflected, relative to the vehicle V, and/or the strength of a received return signal.

The vehicle information detector 5 detects vehicle information, which enables the traveling amount and traveling azimuth of the vehicle V to be derived, and transmits detection results to the moving object detection device 1 in time sequence. In the present disclosure, the vehicle information detector 5 includes a vehicle speed sensor, a steering angle sensor, and an angular velocity sensor for example so as to obtain the vehicle information.

The vehicle speed sensor detects a speed v of the vehicle V, which is hereinafter referred to simply as the vehicle speed v, and generates a signal indicating a detection result. The steering angle sensor detects a steering angle $\phi$ of the vehicle V, which is hereinafter referred to simply as the steering angle $\phi$, and generates a signal indicating a detection result. The angular velocity sensor detects an angular velocity $\omega$ of the vehicle V about a yaw axis, which is hereinafter referred to simply as the angular velocity $\omega$, and generates a signal indicating a detection result. The vehicle speed v, the steering angle $\phi$, and the angular velocity $\omega$ are transmitted to the moving object detection device 1 in time sequence. More specifically, the vehicle speed v, the steering angle $\phi$, and the angular velocity $\omega$ are substantially transmitted in synchronization with the above-described frame periods Tf.

The moving object detection device 1 is accommodated in for example, a casing of an electronic control unit (ECU) and includes a first input circuitry 11, a second input circuitry 13, a controller 15, and an output circuitry 17.

The first input circuitry 11 is an input interface for receiving the positional information P from the object detector 3. Further, under control of the controller 15, the first input circuitry 11 transfers the received positional information to work memory of the controller 15, which is not illustrated. Hereinafter, the work memory is referred to as the work area.

The second input circuitry 13 is an input interface for receiving various kinds of information from the vehicle information detector 5, which include the vehicle speed v, the steering angle $\phi$, and the angular velocity $\omega$. Further, under control of the controller 15, the second input circuitry 13 transfers the received information to the work area.

For example, the controller 15 includes program memory 151, an information accumulator 153, and a microcomputer 155.

For example, the program memory 151 is nonvolatile memory, such as electrically erasable programmable read-only memory (EEPROM). The program 157 with the description of a processing procedure, which is described below, is stored in the program memory 151 in advance.

For example the information accumulator 153 is semi-conductor memory or a hard disk drive. Under control of the microcomputer 155, predetermined information, which is described below in detail, is accumulated in the information accumulator 153 in time sequence.

The microcomputer 155 performs the program 157 using the work area, not illustrated, and on detecting a moving object V1 present around the vehicle V, generates information R indicating that the moving object V1 has been detected. For example, the moving object V1 is a vehicle that enters the area C located in the traveling direction of the vehicle V from a side.

The output circuitry 17 is an output interface for outputting the information R to the vehicle control circuitry 7. Under control of the microcomputer 155, the output circuitry 17 transmits the information R generated in the microcomputer 155 to the vehicle control circuitry 7.

The vehicle control circuitry 7 is a display device, an automatic travel control device, or the like included in the vehicle V and performs a predetermined process based on the information R received from the output circuitry 17.

<2-2. Processing of Controller 15>

A processing procedure of the microcomputer 155 that executes the program 157 is described below by referring to FIGS. 2A and 2B.

The microcomputer 155 acquires a profile of the object detector 3 (step S001). Specifically, the microcomputer 155 receives the positional information P from the object detector 3 through the first input circuitry 11 in time sequence, more specifically in the frame periods Tf, and transfers the received positional information P to the work area, not illustrated, to cause the positional information P to be stored. The positional information P of one frame includes a spatial distance to the reflection position of a radar signal at each of azimuths into which the measurement range of the object detector 3 is divided.

When the microcomputer 155 receives the positional information P of one frame, the microcomputer 155 performs a recognition process of a first continuum K1, a second continuum K2, and an interruption section J (step S003).

Figure 3A:
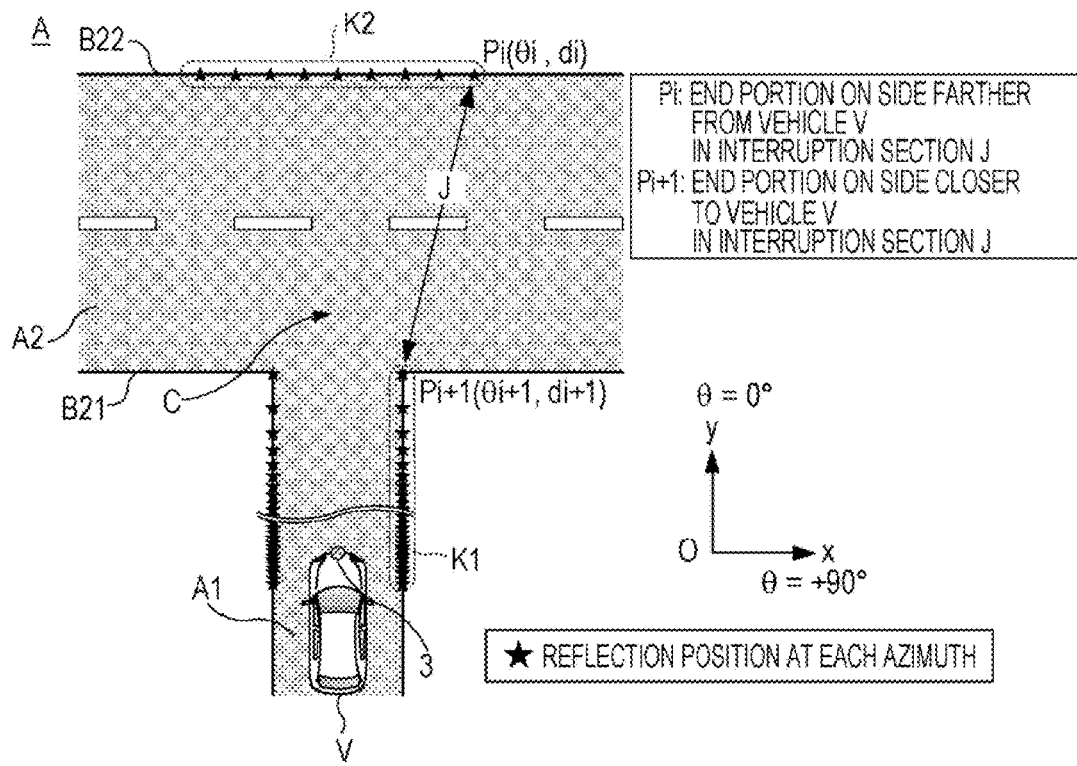
FIG. 3A is a schematic diagram that illustrates a T junction.

A T junction A is illustrated in FIG. 3A. For convenience of explanation, a orthogonal coordinate system defined in Section <1.> is also illustrated. The T junction A includes a traveling road A1 of the vehicle V and an intersecting road A2, which intersects with the traveling road A1. The traveling road A1 is a narrow street for example. For example, obstacles like a wall and a construction are located on both sides of the traveling road A1 The intersecting road A2 connects to the area C, more specifically the intersection C, from both the left and right directions relative to the traveling direction of the vehicle V and intersects with the traveling road A1. FIG. 3A illustrates an example in which it is difficult to view the condition of the intersecting road A2 from the vehicle V when the vehicle V is traveling toward the area C on the traveling road A1 and obstacles exist on both sides of the traveling road A1.

In FIG. 3A, the reflection position of a radar signal is denoted with a star symbol for each of azimuths into which the measurement range of the object detector 3 is divided. Regarding a certain reflection point, specifically the coordinate values of a reflection point Pi, the azimuth is denoted as $\theta_i$ and the spatial distance is denoted as $d_i$. Regarding another reflection point Pi+1, the azimuth is denoted as $\theta_{i+1}$ and the spatial distance is denoted as $d_{i+1}$. The azimuth $\theta_{i+1}$ is an angular step subsequent to the azimuth $\theta_i$. In the example of FIG. 3A, the x axis direction is defined as being at an azimuth of 90° ($\theta=90°$) and the y axis direction is defined as being at an azimuth of 0° ($\theta=0°$). When the traveling road A1 is a narrow street, it is difficult for the object detector 3 to detect a boundary portion B21 between an edge of the intersecting road A2 located on the rear side when viewed from the vehicle V, that is, an edge that is included in the edges of the intersecting road A2 and located in the more negative direction of the y axis, and the outside of the intersecting road A2. Accordingly, as illustrated in FIG. 3A, it is difficult for the object detector 3 to detect a return signal reflected off the boundary portion B21. It is also difficult for the object detector 3 to detect a return signal reflected off a boundary portion B22 between an edge of the intersecting road A2 located on the front side when viewed from the vehicle V, that is, an edge that is included in the edges of the intersecting road A2 and located in the more positive direction of the y axis, and the outside of the intersecting road A2.

Figure 3B:
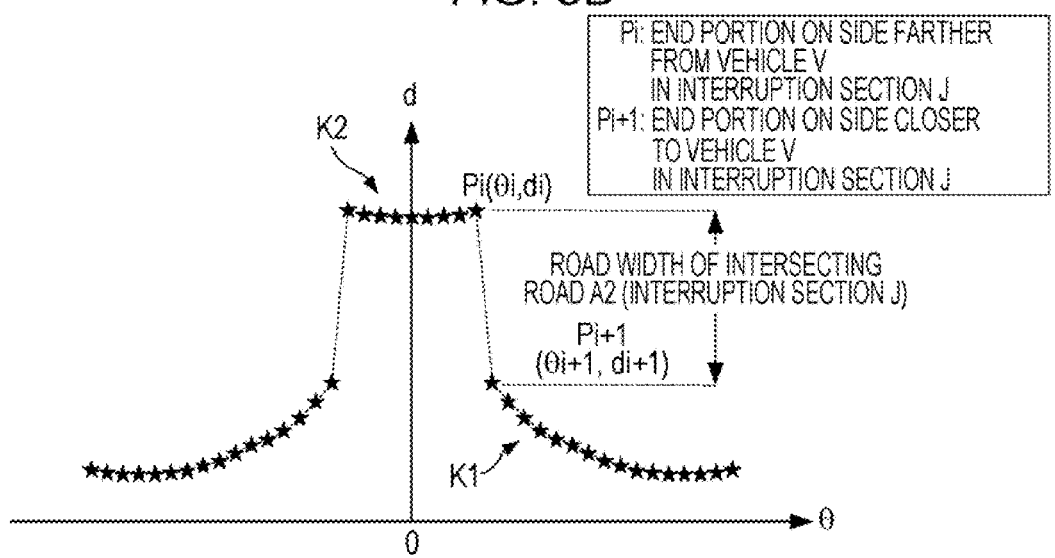
FIG. 3B is a graph that illustrates positional information of one frame, which is output from the object detector in FIG. 1 when the vehicle in FIG. 3A is traveling immediately before an area.

FIG. 3B is a graph that illustrates the positional information P of one frame, which is output from the object detector 3 when the vehicle V is traveling in an area further on the side of the traveling road A1 than the area C. As illustrated in FIG. 3B, when change in the spatial distance d relative to the azimuth $\theta$ is recognized, the spatial distance $d_{i+1}$ at the azimuth $\theta_{i+1}$ is changed largely by the amount that corresponds to the road width of the intersecting road A2 in comparison with the spatial distance $d_i$ at the azimuth $\theta_i$.

A reference value dth, which corresponds to the road width of the intersecting road A2 to be detected (the interruption section), is designated in advance in the program 157. In step S003, the microcomputer 155 calculates an absolute value $|\Delta d0|$ of a difference value between the spatial distances $d_i$ and $d_{i+1}$ of the two azimuths $\theta_i$ and $\theta_{i+1}$ adjacent to each other in the positional information P of this time, and determines whether or not $|\Delta d0|$ is equal to or larger than a reference value dth. When the microcomputer 155 detects reflection points Pi and Pi+1 at which $|\Delta d0|$ is equal to or larger than the reference value dth, the microcomputer 155 determines that the interruption section J along the traveling direction of the vehicle V is present between the reflection point Pi and the reflection point Pi+1. In other words, both ends of the interruption section J are the reflection points Pi and Pi+1.

When the microcomputer 155 detects the interruption section J, the microcomputer 155 selects a reflection point that is the closer one of the reflection points Pi and Pi+1 to the vehicle V, that is, the end portion closer to the vehicle V in the interruption section J, and reflection points whose azimuths $\theta$, that is, angular steps are continuous from the closer reflection point, which is Pi+1 here, in the direction approaching the vehicle V from among the positional information P of this time. Accordingly, a first continuum K1 is constituted. When any object other than the vehicle V, such as another vehicle, is not present in the area C as illustrated in FIG. 3A, the first continuum K1 is constituted of a plurality of reflection points along the traveling road A1, which indicate a boundary between the traveling road A1 and the outside thereof. In FIGS. 3A and 3B, the interruption section J and the first continuum K1 that are present on the right side relative to the traveling direction of the vehicle V may be present on the left side relative to the traveling direction of the vehicle V.

Further, the microcomputer 155 detects reflection points other than the reflection points that constitute the first continuum K1 from the positional information P of this time as the second continuum K2. When illustrated in FIG. 3A, the second continuum K2 is present away from the first continuum K1 by a spatial distance equal to or larger than the reference value dth in the traveling direction of the vehicle V. In FIG. 3A, a portion that is a boundary between the intersecting road A2 and the outside thereof and can be viewed from the object detector 3 is illustrated as a second continuum K2. When the area C is a four-way intersection, the second continuum K2 is present away from the first continuum K1 by a spatial distance equal to or larger than the reference value dth in the traveling direction of the vehicle V and, along the traveling road A1, is constituted of a plurality of reflection points that indicate a boundary between the traveling road A1 and the outside thereof.

Figure 2A:
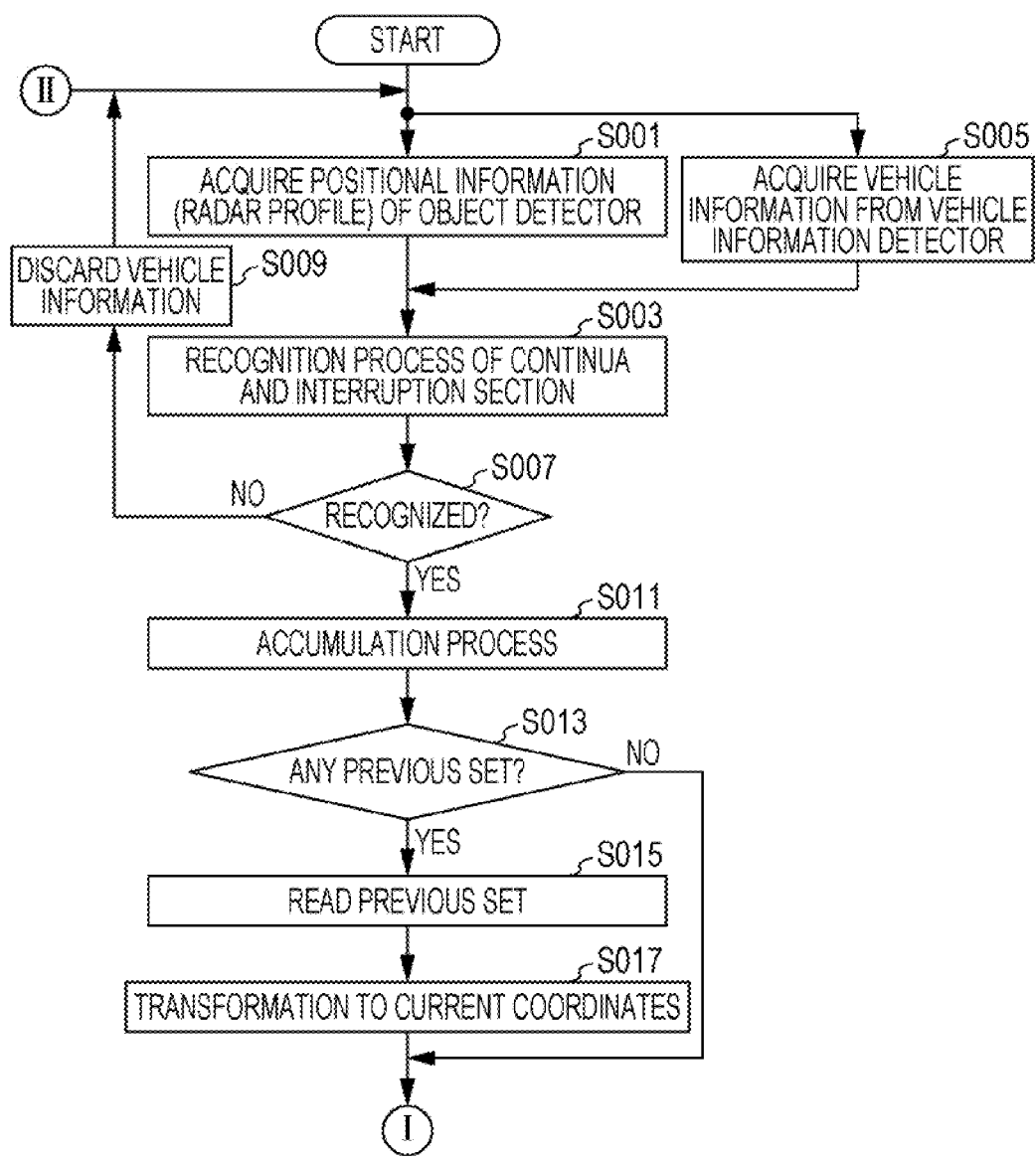
FIG. 2A is a flow chart that illustrates the first half of a processing procedure of a controller according to an embodiment.

In parallel to step S001 in FIG. 2A, the microcomputer 155 receives the vehicle information, which includes the vehicle speed v, the steering angle $\phi$, and the angular velocity $\omega$, from the vehicle information detector 5 through the second input circuitry 13 in time sequence, more specifically in the frame periods Tf and transfers the received vehicle information to the work area to cause the vehicle information to be stored (step S005). Step S005 may be performed before step S001 or be performed after step S001.

When step S003 is complete, the microcomputer 155 determines whether or not both the continua K1 and K2, and the interruption section J have been recognized in step S003 (step S007). When the microcomputer 155 determines NO in step S007, the microcomputer 155 discards the vehicle information obtained in step S005 (step S009) and returns to step S001 so as to process the positional information P of a subsequent frame.

In contrast, when the microcomputer 155 determines YES in step S007, the microcomputer 155 performs an accumulation process (step S011). Specifically, the microcomputer 155 forms sets so that each set contains the reflection points constituting the first continuum K1 and the reflection points constituting the second continuum K2, which have been recognized in step S003, and the vehicle information, which has been obtained in step S005, more specifically the corresponding positional information P and the vehicle information obtained by the vehicle information detector 5 in the identical frame period Tf, and causes the formed sets to be stored in the information accumulator 153 in time sequence. The information accumulator 153 can store a plurality of sets of the reflection points of the continua K1 and K2 and the vehicle information according to a first-in first-out (FIFO) scheme for example. More specifically, for example, the information accumulator 153 can accumulate sets of previous reflection points and vehicle information, which are referred to as the previous sets hereinafter, in addition to a set of the reflection points and vehicle information of this time. The previous sets include at least a set of the reflection points and vehicle information of the preceding time.

Subsequently, the microcomputer 155 determines whether or not there is any previous set in the information accumulator 153 (step S013). When the microcomputer 155 determines NO in step S013, the microcomputer 155 performs step S019.

In contrast, when the microcomputer 155 determines YES in step S013, the microcomputer 155 reads the previous set from the information accumulator 153 (step S015) and transforms the coordinate values of the read previous reflection points into values in a coordinate system of the positional information P of this time (step S017), which is hereinafter referred to as the current coordinate system. The coordinate transformation is described in detail below.

Figure 4:
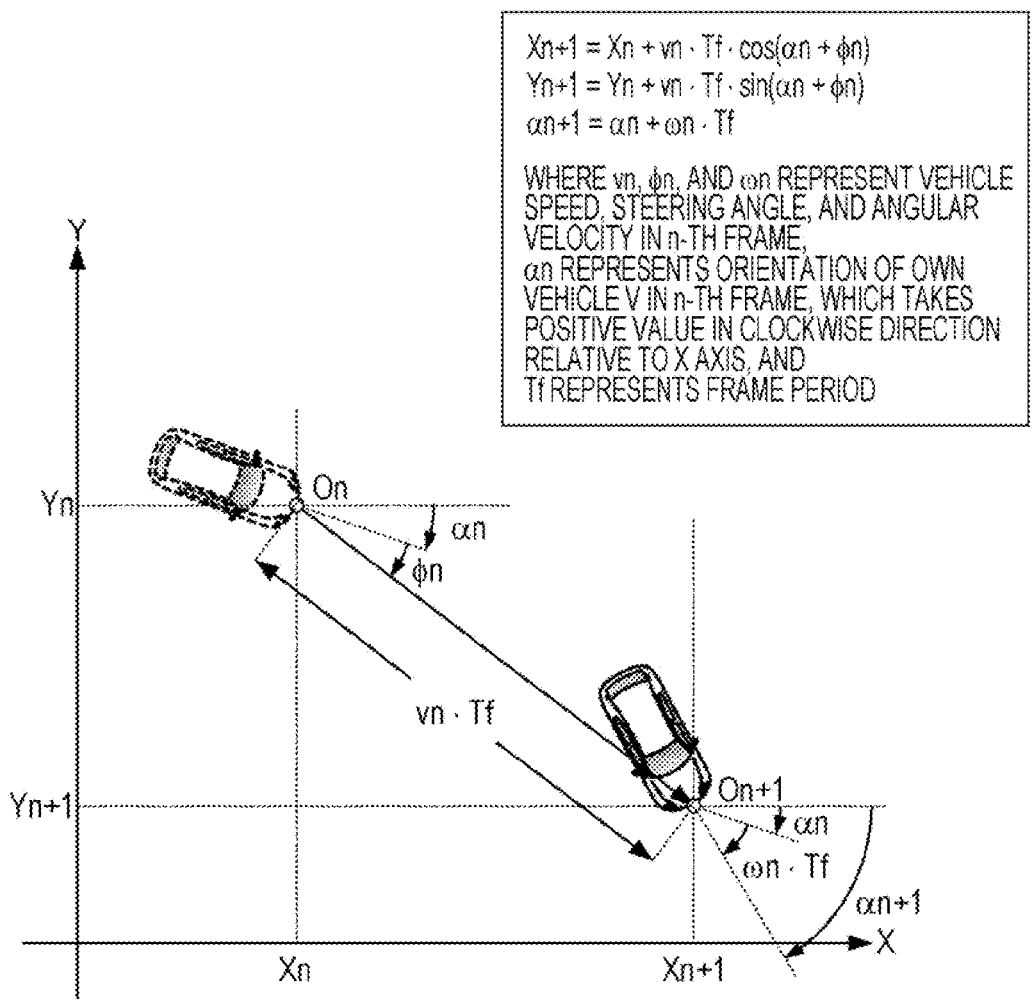
FIG. 4 is a schematic diagram that illustrates an outline of coordinate transformation in step S017 in FIG. 2A.

In FIG. 4, an origin point On in the orthogonal coordinate system of the n-th frame and an origin point On+1 in the orthogonal coordinate system of the n+1-th frame are illustrated. For convenience of explanation, it is assumed that the origin points On and On+1 have coordinate values (Xn, Yn) and (Xn+1, Yn+1), respectively, in a orthogonal coordinate system formed of the X axis and the Y axis. It is also assumed that the vehicle speed v, the steering angle φ, and the angular velocity ω in the same time as the n-th frame are denoted as vn, φn, and ωn, respectively. Tf represents a frame period.

Under the above-described assumption, the vehicle V moves by a distance of vn·Tf between the n-th frame and the n+1-th frame, that is, during a unit frame. In this case, (Xn+1, Yn+1) can be expressed by the following equations (1) and (2) using Xn and Yn:

$$Xn+1 = Xn + vn \cdot Tf \cos(\alpha n + \phi n) \quad (1)$$

$$Yn+1 = Yn + vn \cdot Tf \sin(\alpha n + \phi n) \quad (2)$$

where αn represents the orientation of the vehicle V in the n-th frame. It is assumed that the orientation αn of the vehicle V takes a positive value in a clockwise direction while the X axis indicates 0°.

The orientation αn+1 of the vehicle V in the n+1-th frame can be expressed by the following equation (3):

$$\alpha n+1 = \alpha n + \omega n \cdot Tf \quad (3).$$

As described above, the origin point On (Xn, Yn) of the n-th frame, that is, the position of the object detector 3 indicates (Xn+1, Yn+1) in the n+1-th frame.

On the basis of the equations (1) to (3) above, the microcomputer 155 transforms the coordinate values of each reflection point in a previous set into the coordinate values of the current coordinate system. In the transformation, vn, αn, and φn included in the vehicle information of the previous set are used. Tf represents a predetermined frame period.

When step S017 ends, the coordinate values of the reflection points that constitute the continua K1 and K2 of this time and the coordinate values of the reflection points that have undergone the transformation to the current coordinate system and constitute the previous continua K1 and K2 are stored in the work area. After step S017, the microcomputer 155 determines whether or not the shape of an end portion of the first continuum K1 of this time on the side closer to the second continuum K2 of this time, which is hereinafter referred to simply as the end portion of the first continuum K1 of this time, is changed in comparison with the shape of an end portion of the previous first continuum K1 on the side closer to the previous second continuum K2, which is hereinafter referred to simply as the end portion of the previous first continuum K1 (step S019 in FIG. 2B). An example of the determination of such a change in shape is described below.

Figure 5A:
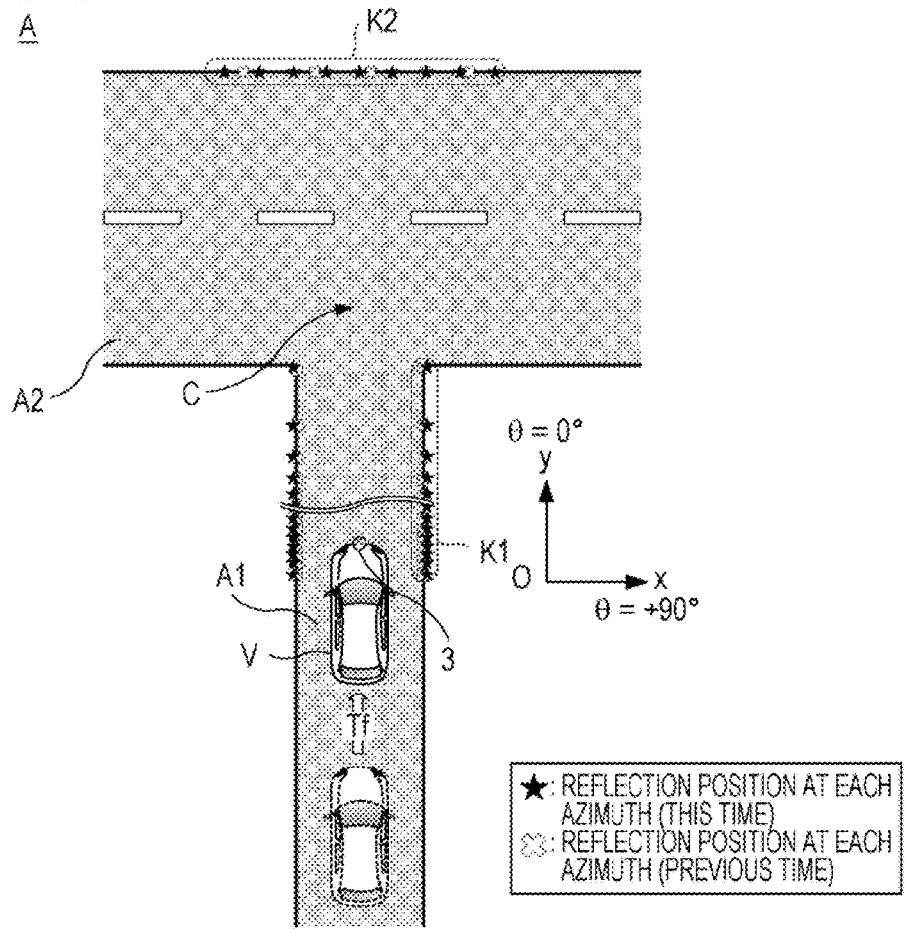
FIG. 5A is a schematic diagram that illustrates a scene where no moving object is entering an area from an intersecting road.
Figure 5B:
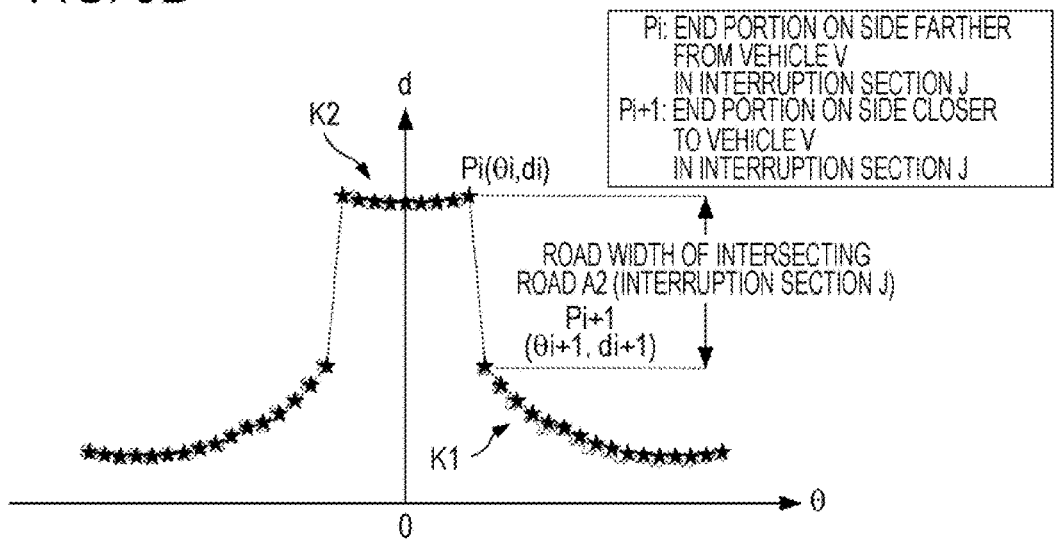
FIG. 5B is a graph that illustrates positional information of this time, which is output from the object detector in FIG. 1 when the vehicle in FIG. 5A is traveling on a traveling road, and previous positional information.

In FIGS. 5A and 5B, the coordinate-transformed coordinate values of the previous reflection points, which are denoted as broken-line cross symbols, and the coordinate values of the reflection points of this time, which are denoted as star symbols, are illustrated on an identical coordinate system. For viewability of the cross symbols, the reflection points of this time are illustrated by being slightly shifted from the boundaries of the traveling road A1 in FIGS. 5A and 5B.

Figure 5C:
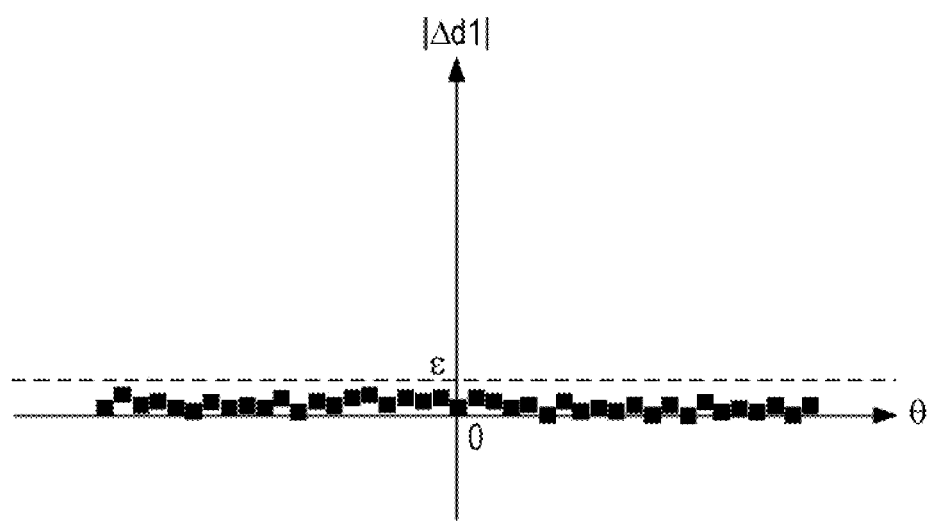
FIG. 5C is a graph that illustrates an absolute value of a first difference value between the positional information of this time and the previous positional information in FIG. 5B.

When a moving object, such as a vehicle, is not entering the area C from the intersecting road A2 as illustrated in FIG. 5A, the previous reflection points denoted as the cross symbols and the reflection points of this time denoted as the star symbols substantially overlap in the current coordinate system. Thus, when in the previous reflection points denoted as the cross symbols and the reflection points of this time denoted as the star symbols, an absolute value |Δd1| of a difference value between the spatial distances d at the mutually identical azimuths θ, which is hereinafter referred to as the absolute value of a first difference value, is calculated, as illustrated in FIG. 5C, the absolute value |Δd1| of each first difference value is substantially zero at every azimuth θ. That is, the first continuum K1 of this time and the previous first continuum K1 substantially overlap each other in the current coordinate system.

Figure 6A:
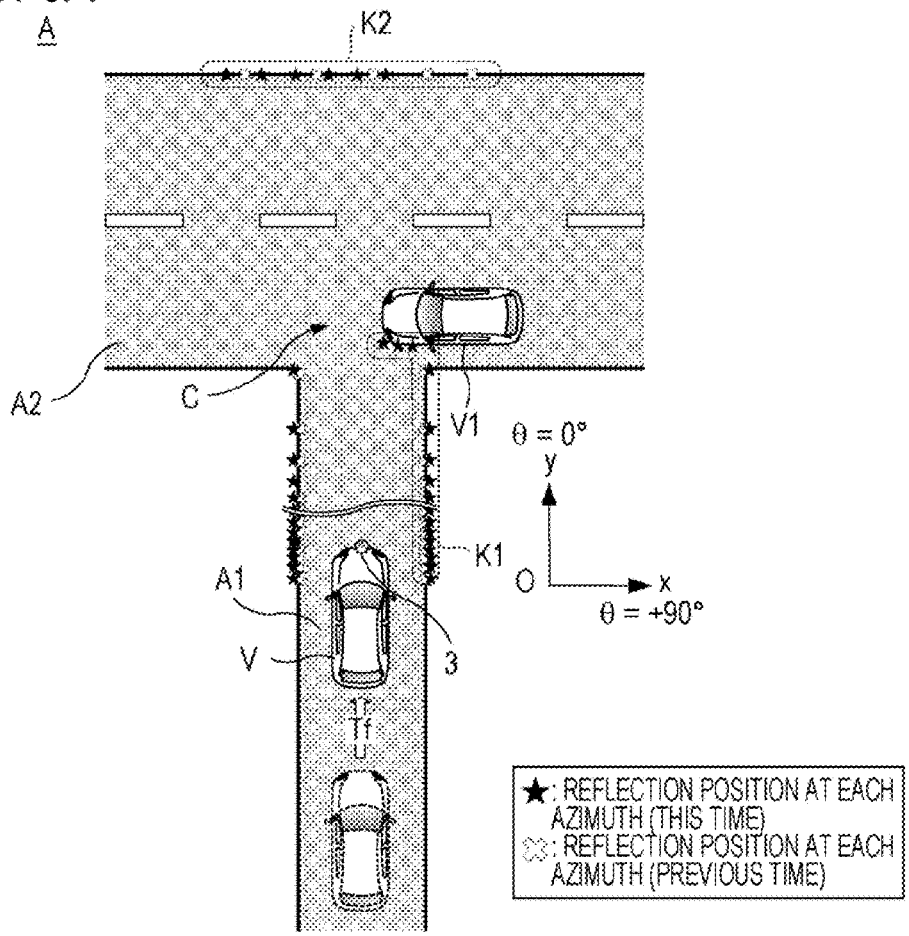
FIG. 6A is a schematic diagram that illustrates a scene where a moving object is entering the area from the intersecting road.

In contrast, it is assumed as illustrated in FIG. 6A that the moving object V1, which is a vehicle for example, is entering the area C from the intersecting road A2 in a frame period Tf of this time. In this case, since a radar signal from the object detector 3 (see FIG. 1) is even reflected off a side face of the moving object V1, the object detector 3 receives a return signal reflected off the moving object V1.

Figure 6B:
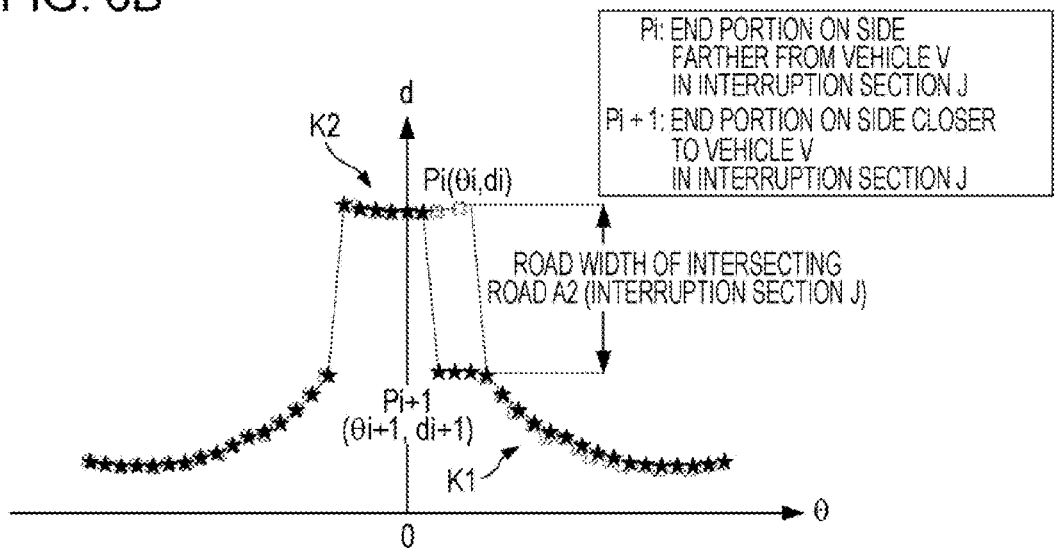
FIG. 6B is a graph that illustrates positional information of this time, which is output from the object detector in FIG. 1 when the vehicle in FIG. 6A is traveling on a traveling road, and previous positional information.

Accordingly, under the circumstances illustrated in FIG. 6A, when the previous reflection points denoted as the cross symbols and the reflection points of this time denoted as the star symbols are depicted in the current coordinate system, as illustrated in FIGS. 6A and 6B, the shape of the end portion of the first continuum K1 of this time is changed in comparison with the shape of the end portion of the previous first continuum K1. More specifically, as illustrated in FIG. 6A, when the moving object V1 is entering the area C, the first continuum K1 of this time is constituted of the reflection points on the side face of the moving object V1 in addition to the plurality of reflection points that indicate the boundary between the traveling road A1 and the outside thereof along the traveling road A1. In contrast, the previous first continuum K1 is constituted of the plurality of reflection points that indicate the boundary between the traveling road A1 and the outside thereof along the traveling road A1 (see FIG. 3A). Also in FIG. 6A, for viewability, the reflection points of this time are illustrated by being shifted from the boundary of the traveling road A1.

Figure 6C:
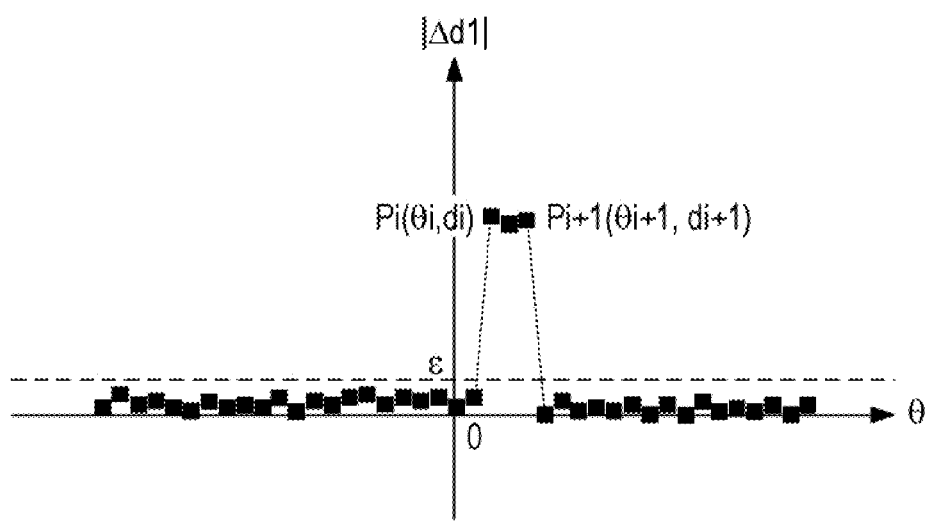
FIG. 6C is a graph that illustrates an absolute value of a first difference value between the positional information of this time and the previous positional information in FIG. 6B.

When, according to the above-described change in shape, the absolute value $|\Delta d1|$ of the first difference value between the spatial distances d at the identical azimuth $\theta$ in the coordinate values of the reflection points that constitute the previous first continuum K1 and the first continuum K1 of this time is calculated, as illustrated in FIG. 6C, the absolute value $|\Delta d1|$ of the first difference value largely changes at the azimuths $\theta i$ and $\theta i+1$ and largely exceeds zero between these azimuths.

A specific process of the microcomputer 155 in step S019 is described below.

The microcomputer 155 calculates the absolute value $|\Delta d1|$ of the first difference value between the spatial distances d at the mutually identical azimuths $\theta$ in the first continuum K1 of this time and the previous first continuum K1. Subsequently, the microcomputer 155 determines whether or not all the calculated absolute values $|\Delta d1|$ of the first difference value exceed a predetermined threshold value $\epsilon$ (see FIGS. 5C and 6C). The threshold value $\epsilon$ is a value obtained by adding a predetermined margin to zero. The threshold value $\epsilon$ is set to for example, a value that is approximately equal to $|\Delta d1|$ except $|\Delta d1|$ corresponding to the azimuth $\theta i$ and $|\Delta d1|$ corresponding to the azimuth $\theta i+1$. The threshold value $\epsilon$ is suitably set as desired on the basis of the experiments, simulations, or the like performed at the development stage of the moving object detection device 1.

Figure 2B:
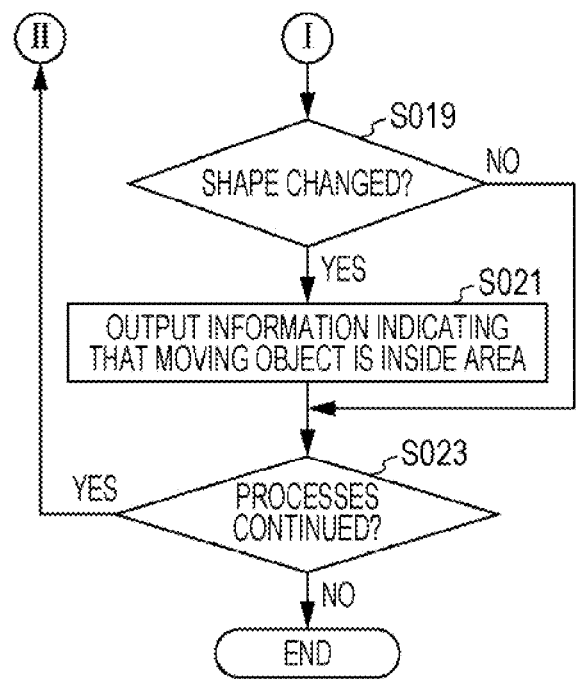
FIG. 2B is a flow chart that illustrates the latter half of the processing procedure following FIG. 2A.

When in step S019 in FIG. 2B, all the absolute values $|\Delta d1|$ of the first difference value are equal to or smaller than the threshold value $\epsilon$, the microcomputer 155 determines that the shape of the end portion of the first continuum K1 of this time is not changed in comparison with the shape of the end portion of the previous first continuum K1 (NO in step S019). When it is NO in step S019, the microcomputer 155 performs step S023. Also when it is determined in step S013 that there is no previous set, it is determined in step S019 that no change in shape is caused. That is, when NO is determined in step S013, NO is determined in step S019.

In contrast, when in step S019 in FIG. 2B, all the absolute values $|\Delta d1|$ of the first difference value are not equal to or smaller than the threshold value $\epsilon$, the microcomputer 155 determines that change is caused in the shape of the end portion of the first continuum K1 of this time (YES in step S019). When it is YES in step S019, the microcomputer 155 performs step S021.

In step S021, the microcomputer 155 causes a display device, which is an example of the vehicle control circuitry 7, to display the information R indicating that the moving object V1 has entered the area C and is present therein through the output circuitry 17. When the vehicle V can travel automatically, the microcomputer 155 may output the information R through the output circuitry 17 to an automatic travel control device, which is another example of the vehicle control circuitry 7. The display device displays that the moving object V1 is present in the area C in the traveling direction of the vehicle V to notify the driver of the vehicle V thereof. The automatic travel control device slows down or stops the vehicle V in response to the input of the information R.

In the present disclosure, in step S019, the microcomputer 155 detects change over time in the shape of the end portion of the first continuum K1 only. The microcomputer 155 may detect change over time in the shapes of the end portions of both the continua K1 and K2. Also in this case, the microcomputer 155 can output the information R that correctly indicates that the moving object V1 has entered the area C and is present therein.

After step S021 or determining NO in step S019, the microcomputer 155 determines whether or not to continue the processes in FIGS. 2A and 2B (step S023) and when the microcomputer 155 determines YES in step S023, the microcomputer 155 performs step S001 again. In contrast, when the microcomputer 155 determines NO in step S023, the microcomputer 155 ends the processes in FIGS. 2A and 2B.

<2-3. Major Effects and Advantages of Moving Object Detection Device 1>

As described above, in the moving object detection device 1, the microcomputer 155 processes the positional information P in time sequence, which the first input circuitry 11 receives, and detects both the continua K1 and K2 (step S003 in FIG. 2A). When the shape of the end portion of the continuum K1 of this time is changed in comparison with the shape of the end portion of the previous continuum K1 (see step S019 in FIG. 2B and FIG. 6C), the microcomputer 155 outputs the information R indicating that the moving object V1 is present in the area C in the traveling direction of the vehicle V to the vehicle control circuitry 7 included in the vehicle V (step S021). Thus, since the moving object detection device 1 detects the moving object V1 on the basis of change over time in the shape of the end portion of the first continuum K1, even when only one face of the moving object V1 can be viewed from the object detector 3, the moving object detection device 1 can detect the moving object V1 correctly and stably.

<2-4. Other Effects and Advantages of Moving Object Detection Device 1>

A typical millimeter wave radar detects a moving object using the Doppler shift and in such a scene as FIG. 6A, it is difficult for the millimeter wave radar to detect the moving object V1 entering the area C from the intersecting road A2 unless the vehicle V approaches the area C to a certain extent. This is because when the vehicle V is distant from the area C, a component toward the direction of the vehicle V, which is included in the relative speed of the moving object V1 to the vehicle V, becomes closer to zero.

In contrast, as described above, since the moving object detection device 1 detects the moving object V1 on the basis of change over time in the shape of the end portion of the first continuum K1, even when the vehicle V is traveling in a distant place on the traveling road A1 from the area C, the moving object V1 can be detected stably.

In addition, in the moving object detection device 1, when the object detector 3 receives a return signal reflected off the moving object V1, change in the shape of the end portion of the first continuum K1 appears in the positional information P processed by the controller 15. Accordingly, the moving object detection device 1 can detect the presence of the moving object V1 early in comparison with conventional techniques.

A recent collision avoidance system for vehicles monitors a short range of a vehicle using a stereo camera or the like and monitors a long range of the vehicle using a millimeter wave radar or the like. The moving object detection device 1, however, can monitor a short range of the vehicle V using a laser radar or a millimeter wave radar. In other words, since employing the moving object detection device 1 enables a short range to be monitored without any stereo camera or the like, a collision avoidance system for vehicles can be implemented at low cost.

3. Variations

Variations of the above-described moving object detection device 1 are described below.

<3-1. Configuration and Processes of Moving Object Detection Device 1A According to First Variation>

First, a moving object detection device 1A according to a first variation of the above-described embodiment is described. In FIG. 1, compared with the moving object detection device 1, the moving object detection device 1A is different in that a program 157A is stored in the program memory 151 instead of the program 157. In the moving object detection device 1A, identical references are given to the constituents equivalent to those of the moving object detection device 1 and descriptions of the constituents with the identical references are omitted as suitable.

Figure 7:
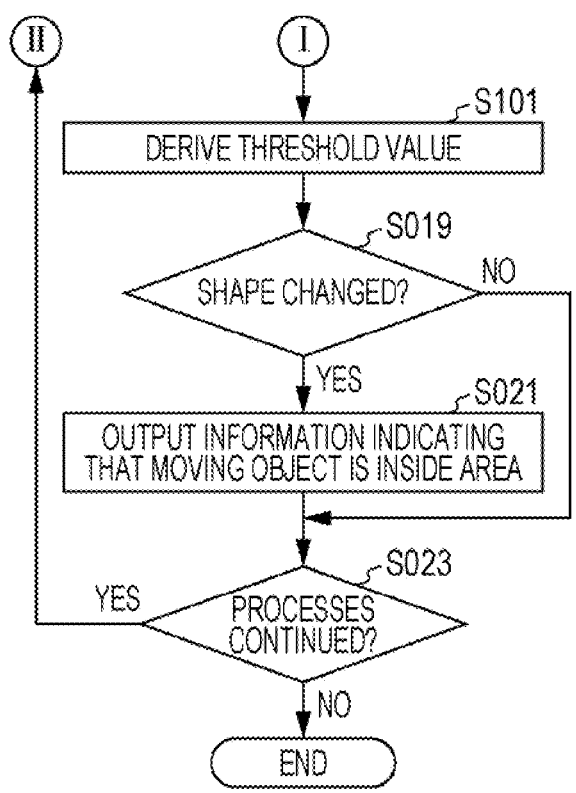
FIG. 7 is a flow chart that illustrates the latter half of a processing procedure of a controller according to a first variation.

A processing procedure of the microcomputer 155 that executes the program 157A is described by referring to FIG. 7.

Figure 8A:
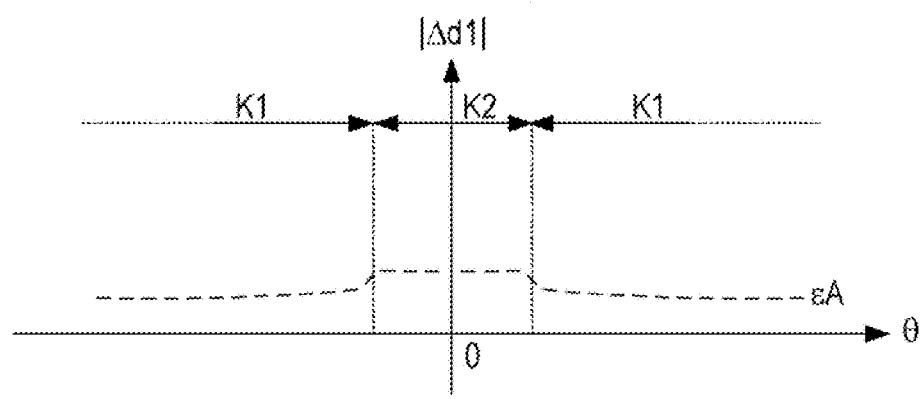
FIG. 8A is a graph that illustrates a threshold value according to the first variation.

When it is NO in step S013 or the process of step S017 ends in FIG. 2A, the microcomputer 155 performs the processes in FIG. 7 instead of the processes in FIG. 2B. In step S101, on the basis of the coordinate values of the previous reflection points that have undergone coordinate transformation in step S017, the microcomputer 155 derives a threshold value εA, which varies with azimuths. Specifically, as illustrated in FIG. 8A, the threshold value εA, which is a value obtained by multiplying the spatial distance d at each of the azimuths θ indicated by the coordinate-transformed previous reflection points by a predetermined coefficient α, depends on the azimuth θ and for example, is decided by assigning a weight at least to the proximity of the azimuth θ at which the end portion of the first continuum K1 is present. The threshold value εA for the azimuth θ at which the end portion of the first continuum K1 is present is caused to be larger than the threshold value εA for the azimuths θ at which the first continuum K1 except the end portion is present. In this case, it is sufficient for α to satisfy the expression, 0<α<1.0 and α is set to 0.1 for example.

Figure 8B:
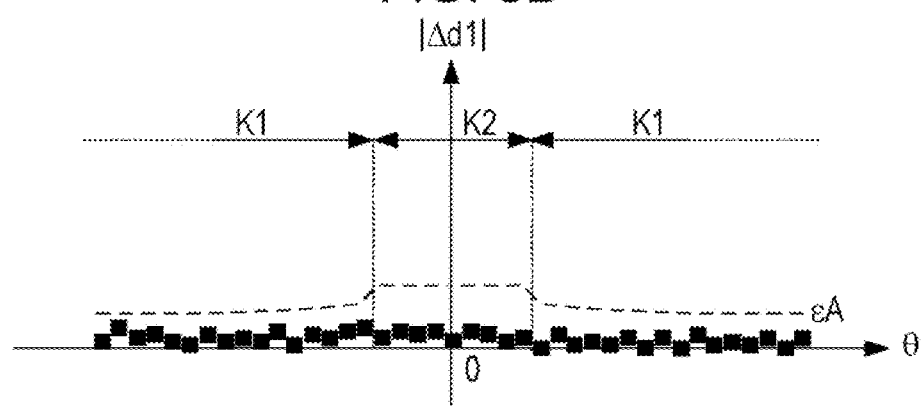
FIG. 8B is a graph that illustrates an absolute value of the first difference value in a case where no moving object is entering the area from the intersecting road, and the threshold value in FIG. 8A.
Figure 8C:
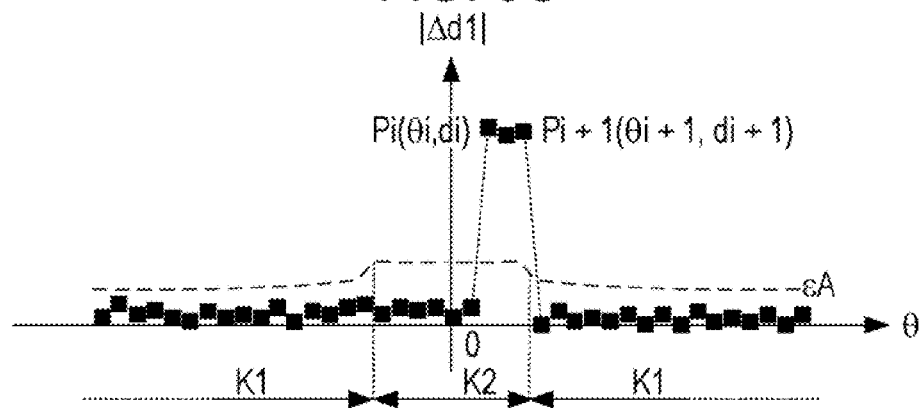
FIG. 8C is a graph that illustrates an absolute value of the first difference value in a case where no moving object is entering the area from the intersecting road, and the threshold value in FIG. 8A.

When the process of step S101 ends, the microcomputer 155 performs the processes in steps S019 to S023 in FIG. 7 described above in the embodiment. Since the above-described threshold value εA is used in step S019, as illustrated in FIG. 5A, when the moving object V1 is not entering the area C from the intersecting road A2, the relation between the threshold value εA and the absolute value |Δd1| of the first difference value becomes as illustrated in FIG. 8B. In contrast, when the moving object V1 is entering the area C from the intersecting road A2 as illustrated in FIG. 6A, the relation between the threshold value εA and the absolute value |Δd1| of the first difference value becomes as illustrated in FIG. 8C.

<3-2. Effects and Advantages of Moving Object Detection Device 1A>

The present variation can bring the advantages described below in addition to the effects and advantages described in Sections <2-3.> and <2-4.>. That is, in step S019, the threshold value εA obtained by assigning a weight to the azimuths θ at which the proximity of the end portion of the first continuum K1 is present. Accordingly, unless the position of the end portion of the first continuum K1 of this time is changed from the position of the end portion of the previous first continuum K1 by an amount equal to or larger than a predetermined amount, the information R is not output in step S021. Thus, since the moving object detection device 1A can reduce detection errors of the moving object V1, the moving object detection device 1A can perform more stable detection than the moving object detection device 1.

<3-3. Configuration and Processes of Moving Object Detection Device 1B According to Second Variation>

The moving object detection device 1B according to a second variation of the above-described embodiment is described below. In FIG. 1, compared with the moving object detection device 1, the moving object detection device 1B is different in that a program 157B is stored in the program memory 151 instead of the program 157. In the moving object detection device 1B, identical references are given to the constituents equivalent to those of the moving object detection device 1 and descriptions of the constituents with the identical references are omitted as suitable.

Figure 9:
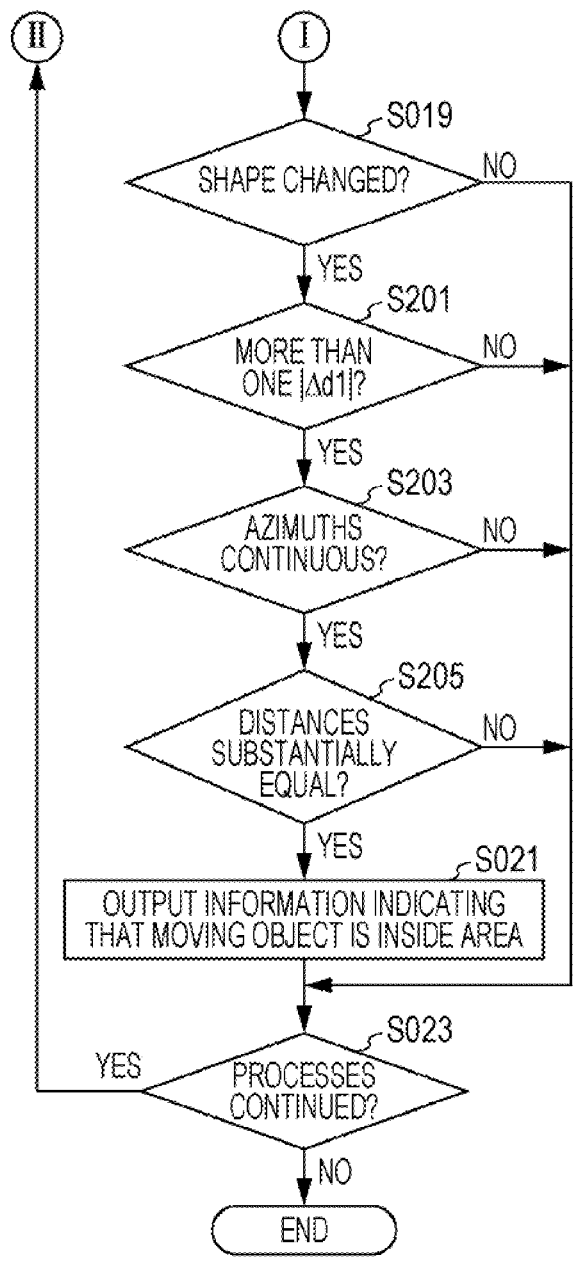
FIG. 9 is a flow chart that illustrates the latter half of a processing procedure of a controller according to a second variation.

A processing procedure of the microcomputer 155 that executes the program 157B is described by referring to FIG. 9.

When it is NO in step S013 or the process of step S017 ends in FIG. 2A, the microcomputer 155 performs the processes in FIG. 9 instead of the processes in FIG. 2B. When the microcomputer 155 determines YES in step S019 in FIG. 9, the microcomputer 155 determines whether or not there is more than one absolute value |Δd1| exceeding the threshold value ε(step S201).

When the microcomputer 155 determines YES in step S201, the microcomputer 155 acquires the respective azimuths θ corresponding the absolute values |Δd1| that exceed the threshold value ε from the coordinate values constituting the first continuum K1 of this time and determines whether or not the respective azimuths θ are continuous (step S203). That "the respective azimuths θ are continuous" indicates the angular steps being continuous like θi, θi+1, and so forth.

When the microcomputer 155 determines YES in step S203, the microcomputer 155 acquires the respective spatial distances d corresponding the absolute values |Δd1| that exceed the threshold value ε from the first continuum K1 of this time and determines whether or not the respective spatial distances d are substantially equal to each other (step S205). The detection of whether or not the spatial distances d acquired in step S205 are substantially equal to each other is performed, based on whether or not a standard deviation σ of each spatial distance d is equal to or smaller than a predetermined threshold value.

When the standard deviation σ is equal to or smaller than the predetermined threshold value, the microcomputer 155 determines that the spatial distances d are substantially equal to each other (YES in step S205). When the standard deviation σ exceeds the predetermined threshold value, the microcomputer 155 determines that the spatial distances d are substantially unequal to each other (NO in step S205). When the microcomputer 155 determines YES in step S205, the microcomputer 155 performs the process of step S021 and the processes after step S021. In contrast, when the microcomputer 155 determines NO in step S019, S201, S203, or S205, the microcomputer 155 performs step S023.

<3-4. Effects and Advantages of Moving Object Detection Device 1B>

The present variation can bring the advantages described below in addition to the effects and advantages described in Sections <2-3.> and <2-4.>. That is, when the moving object V1 enters the area C as in FIG. 6A, the object detector 3 receives return signals reflected off the moving object V1 at the plurality of azimuths θ. The plurality of spatial distances d from the object detector 3 to the plurality of reflection points on the moving object V1 are substantially equal to each other. In the present variation, through the addition of the processes of steps S201 to S203 in FIG. 9, the microcomputer 155 generates the information R in step S021 when the difference between the spatial distance d from the object detector 3 to the end portion of the first continuum K1 of this time and the spatial distance d from the object detector 3 to the reflection point at least at the adjacent azimuth θ to the end portion of the first continuum K1 of this time is equal to or smaller than a threshold value. Accordingly, the accuracy of the detection of the moving object V1 can be enhanced.

<3-5. Configuration and Processes of Moving Object Detection Device 1C According to Third Variation>

The moving object detection device 1C according to a third variation of the above-described embodiment is described below. In FIG. 1, compared with the moving object detection device 1, the moving object detection device 1C is different in that a program 157C is stored in the program memory 151 instead of the program 157. In the moving object detection device 1C, identical references are given to the constituents equivalent to those of the moving object detection device 1 and descriptions of the constituents with the identical references are omitted as suitable.

Figure 10:
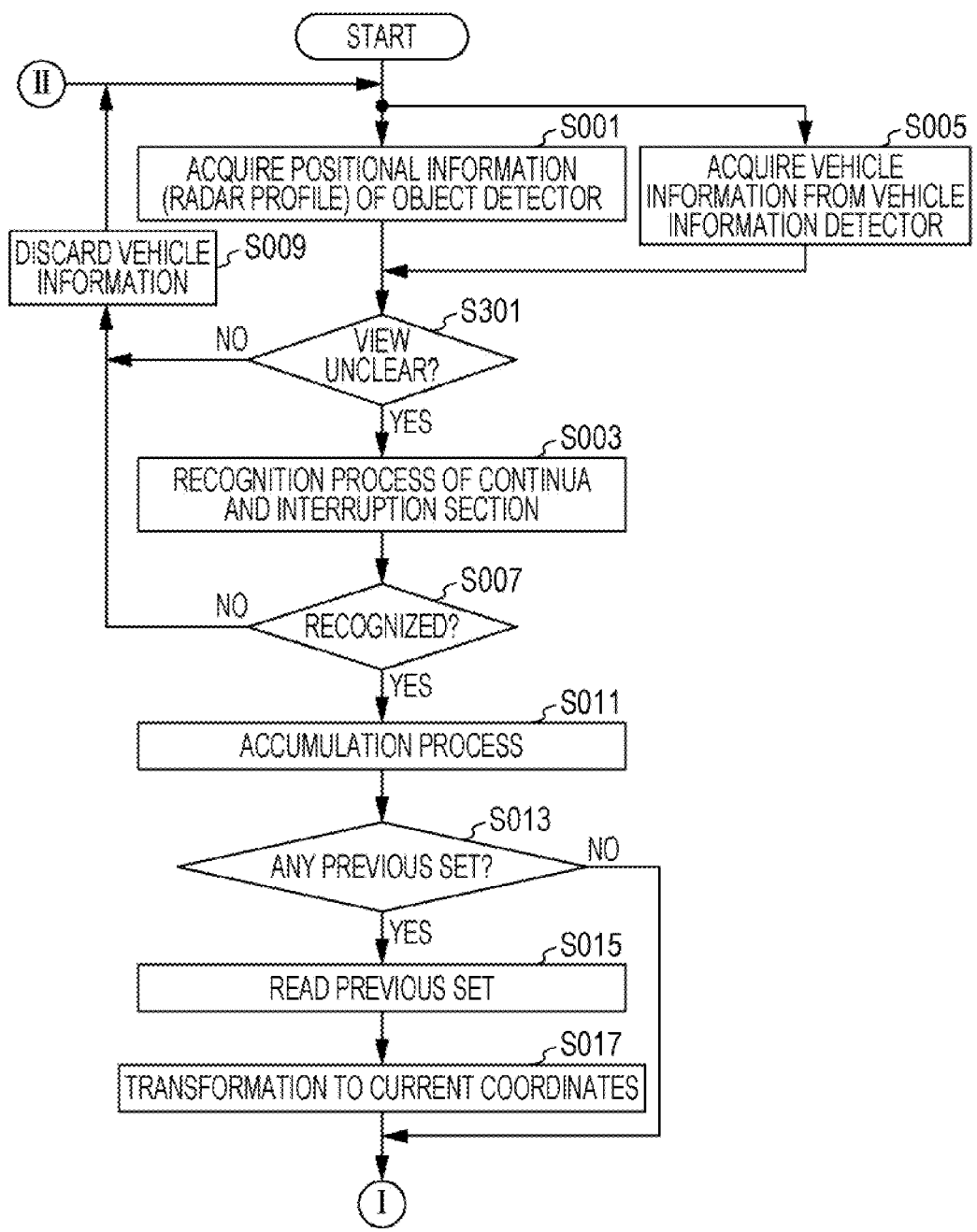
FIG. 10 is a flow chart that illustrates the first half of a processing procedure of a controller according to a third variation.

A processing procedure of the microcomputer 155 that executes the program 157C is described by referring to FIG. 10.

First, the microcomputer 155 performs the processes in FIG. 10 instead of the processes in FIG. 2A. In FIG. 10, after steps S001 and S005 described above in the embodiment, the microcomputer 155 determines whether or not the view in the traveling direction of the vehicle V is unclear (step S301). An example of the process of step S301 is described below.

For example, after the road width of the traveling road A1 of the vehicle V (see FIG. 5A etc.) is determined according to the positional information obtained by the object detector 3, when the determined road width is smaller than a predetermined reference value, the microcomputer 155 determines that the view in the traveling direction of the vehicle V is unclear.

For example, when the moving object detection device 1C can communicate with a known navigation device, after the current traveling position of the vehicle V is determined, the road width of the current traveling road is acquired from known network data. When the acquired road width is smaller than the predetermined reference value, the microcomputer 155 determines that the view in the traveling direction of the vehicle V is unclear. When the moving object detection device 1C can communicate with a known navigation device and when the attribute of the current traveling road A1 is a narrow street, the microcomputer 155 may determine that the view in the traveling direction of the vehicle V is unclear.

When the microcomputer 155 determines YES in step S301, the microcomputer 155 performs the process of step S003 and the processes after step S003 except step S009, which are described above in the embodiment. In contrast, when the microcomputer 155 determines NO in step S301, the microcomputer 155 performs the process of step S009.

<3-6. Effects and Advantages of Moving Object Detection Device 1C>

The present variation can bring the advantages described below in addition to the effects and advantages described in Sections <2-3.> and <2-4.>. That is, in the moving object detection device 1C, only when the vehicle V is traveling on the traveling road A1 where the view is unclear, the detection of the moving object V1 is performed. Thus, processing loads of the microcomputer 155 can be reduced. Further, in the moving object detection device 1C, since the detection of the moving object V1 is not performed for the traveling road A1 where the view in the traveling direction of the vehicle V is clear, outputting the information R when unnecessary can be inhibited.

<4-1. Supplementary Note>

Although the above-described embodiment describes an example in which the vehicle speed v, the steering angle φ, and the angular velocity ω are obtained by a vehicle speed sensor, a steering angle sensor, and an angular velocity sensor, the present disclosure is not limited to this example. For example, the vehicle speed v may be determined using an integral value of an acceleration sensor or an output value of a Global Positioning System (GPS) receiver. For another example, the vehicle speed v may be determined using the coordinate values of a stationary object in the positional information P. Moreover, for example, the angular velocity ω may be derived using a detection value of the steering angle sensor.

Although the first variation describes an example in which the threshold value εA is determined by multiplying the spatial distance d at each of the azimuths θ corresponding to the coordinate-transformed previous first continuum K1 by the predetermined coefficient α, the present disclosure is not limited to this example. For example, another threshold value may be determined in step S101 (see FIG. 7) by combining the threshold value ε and the threshold value εA, depending on the azimuth θ, and the determined threshold value may be used in step S019 in FIG. 2B.

The processes described in selected two or more of the first to third variations may be combined and the combined processes may be incorporated in the moving object detection device 1.

Although examples in which the programs 157 and 157A to 157C are each stored in the program memory 151 are described above, the present disclosure is not limited to these examples. For example, the programs 157 and 157A to 157C may each be stored in a computer-readable recording medium, such as a digital versatile disc (DVD). For another example, the programs 157 and 157A to 157C may each be stored in a server so that the programs 157 and 157A to 157C can be downloaded to various terminal devices, which include a desktop personal computer, a smartphone, and a tablet terminal.

Although examples in which, to detect the moving object V1 entering the area C from the intersecting road A2, the moving object detection devices 1 and 1A to 1C each detect the second continuum K2 in addition to the first continuum K1 and when it is determined that the shape of the end portion of the first continuum K1 of this time is changed in comparison with the shape of the end portion of the previous first continuum K1, generate the information R indicating that the moving object V1 has entered the area C are described above, the present disclosure is not limited to these examples.

Figure 11A:
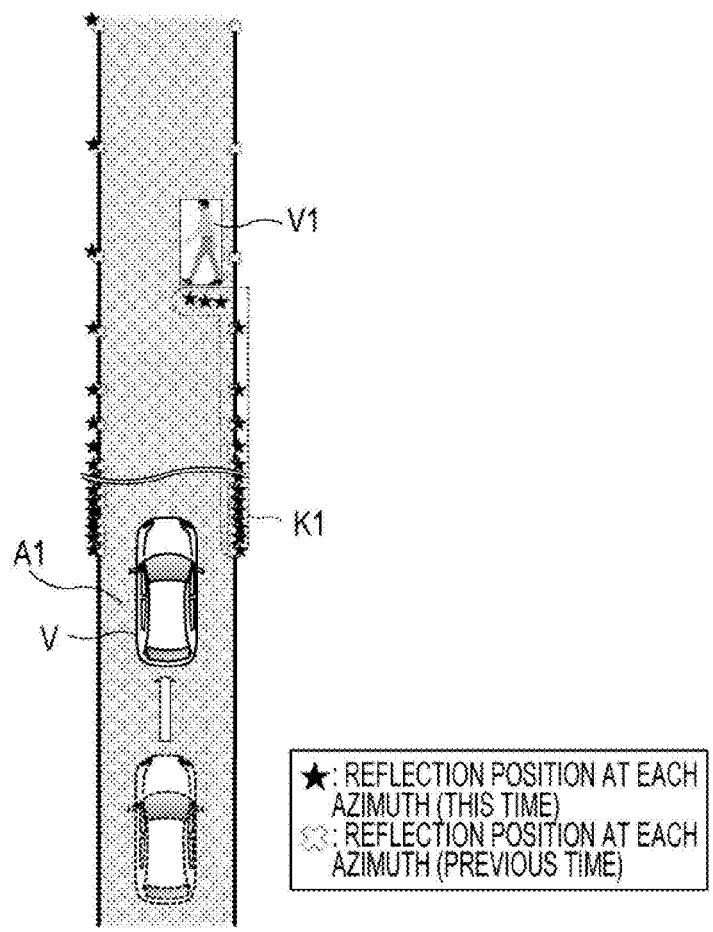
FIG. 11A is a schematic diagram that illustrates a scene where a moving object is entering the traveling road from the outside of the traveling road.
Figure 11B:
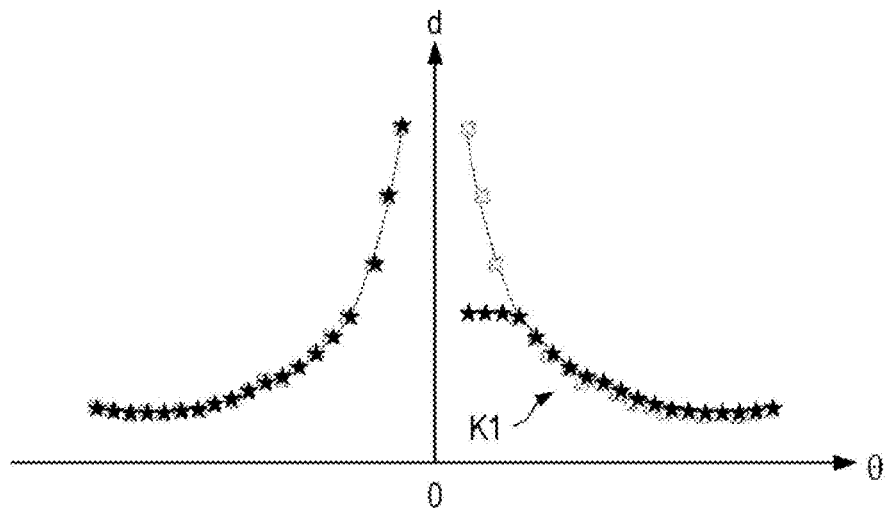
FIG. 11B is a graph that illustrates positional information of this time, which is output from the object detector in FIG. 1 when the vehicle in FIG. 6A is traveling on the traveling road, and previous positional information.
Figure 11C:
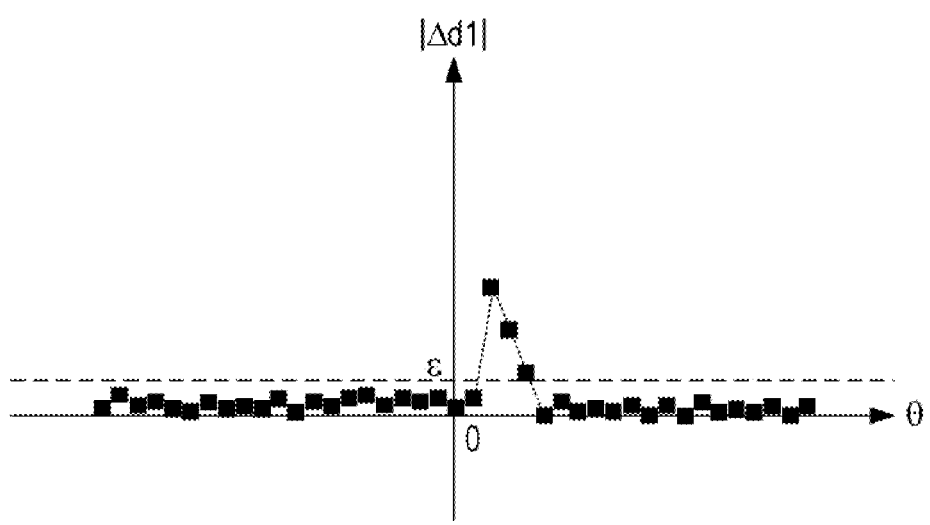
FIG. 11C is a graph that illustrates an absolute value of the first difference value between the positional information of this time and the previous positional information in FIG. 6B.

For example, as illustrated in FIG. 11A, the moving object detection device 1 and 1A to 1C may each detect the moving object V1 entering the traveling road A1 toward the center in the width direction from a side of the traveling road A1, which is a person or a bicycle for example. In this case, however, before the moving object V1 enters the traveling road A1 toward the center in the width direction from the side of the traveling road A1, the microcomputer 155 can only detect the first continuum K1 along the traveling road A1 of the vehicle V even when the microcomputer 155 processes the positional information P received by the first input circuitry 11 in time sequence (see FIG. 11B). In this case, therefore, in step S003 in FIG. 2A or the like, only the detection of the first continuum K1 is performed without performing the detection of the second continuum K2 and the interruption section J. For example, in step S019 in FIG. 2B, whether or not the shape of the first continuum K1 of this time is changed in comparison with the shape of the previous first continuum K1 and when it is YES in step S019, that is, when as illustrated in FIG. 11C, the absolute value of the difference value between the spatial distances d at the identical azimuth θ in the first continuum K1 of this time and the previous first continuum K1 exceeds the threshold value ε or the like, the information R is generated.

The present disclosure can be implemented using software, hardware, or software in cooperation with hardware.

Each functional block used in the description of the embodiment above can be partly or entirely implemented as a large-scale integration (LSI), which is an integrated circuit, and each process described above in the embodiment may be controlled partly or entirely by a single LSI or a combination of LSIs. Such LSIs may be formed as individual chips, or as a single chip so as to include part or all of the functional blocks. The LSI may include an input and an output of data. The LSI may be referred to as an IC, a system LSI, a super LSI, or an ultra LSI, depending on a difference in the degree of the integration.

The LSI is not a limited technique for the circuit integration, which may be achieved using a dedicated circuit, a general-purpose processor, or a special-purpose processor. A field programmable gate array (FPGA), which is programmable after the manufacture of the LSI, or a reconfigurable processor, which enables the connections and settings of circuit cells inside the LSI to be reconfigured, may also be utilized. The present disclosure may be implemented as digital processing or analogue processing.

Moreover, when other circuit integration techniques that can replace the LSI are brought as a result of the advancement of semiconductor techniques or other derivative techniques, the functional blocks may be integrated using such techniques of course. Biotechnology can be applied for example.

The moving object detection device according to the present disclosure can detect a moving object more stably and is applicable to a navigation device, an automatic travel control device, and the like.

What is claimed is:

1. A moving object detection device comprising:
a first input circuitry that, in operation, receives, from a radar object detector included in a vehicle, positional information indicating a position of an object present around the vehicle in time sequence, which includes a plurality of reflection points reflected by at least part of the object, the plurality of reflection points respectively corresponding to a plurality of azimuth positions from the radar object detector; and
a controller that, in operation, processes the positional information received by the first input circuitry in the time sequence including at least a first continuum object along a traveling road of the vehicle, determines, based on the plurality of reflection points respectively corresponding to the plurality of azimuth positions from the radar object detector, that a shape of an end portion of the first continuum object of this time changes in comparison with a shape of an end portion of a previous detected first continuum object, and outputs, to a vehicle control circuitry of the vehicle, information indicating that another moving object different from the vehicle is present.

2. The moving object detection device according to claim 1, comprising:
a second input circuitry that, in operation, receives vehicle information related to a move of the vehicle in time sequence, wherein
the controller, in operation,
transforms coordinate values of the previous detected first continuum object into coordinate values that correspond to a coordinate system of coordinate values indicating the first continuum object of this time on basis of the vehicle information received by the second input circuitry, and
detects the change of the shape of the end portion of the first continuum object of this time on basis of at least the coordinate-transformed coordinate values indicating the previous detected first continuum object and the coordinate values indicating the first continuum object of this time.

3. The moving object detection device according to claim 2, wherein
each positional information received by the first input circuitry includes coordinate values at each of the plurality of azimuth positions relative to the radar object detector, and
the controller, in operation, determines that the shape is changed at least when a difference value between coordinate-transformed first coordinate values indicating the end portion of the previous detected first continuum object and second coordinate values indicating the end portion of the first continuum object of this time is equal to or larger than a first threshold value obtained by assigning a weight for each azimuth position of the plurality of azimuth positions on basis of the positional information received previously by the first input circuitry.

4. The moving object detection device according to claim 2, wherein
each of the plurality of reflection points included in the positional information received by the first input circuitry includes coordinate values, wherein each coordinate value comprises a spatial distance of the reflection points at each azimuth position of the plurality of azimuth positions into which a measurement range of the radar object detector is divided, and
the controller, in operation, generates information indicating that the moving object is present at least when a difference value between coordinate-transformed first coordinate values indicating the end portion of the previous detected first continuum object and second coordinate values indicating the end portion of the first continuum object of this time is equal to or larger than a second threshold value and when a first spatial distance between the end portion of the first continuum of this time and the radar object detector and a second spatial distance between an end portion corresponding to at least an azimuth position adjacent to an azimuth position of the end portion and the radar object detector are substantially identical to each other.

5. The moving object detection device according to claim 1, wherein the controller, in operation, processes the positional information received by the first input circuitry in time sequence, detects a second continuum object that is at a first distance from the first continuum object farther in a traveling direction of the vehicle than the first continuum object, and when the shape of the end portion of the first continuum object of this time on a side closer to the second continuum object is changed in comparison with the shape of the end portion of the previous detected first continuum object on the side closer to the second continuum object, outputs the information to the vehicle control circuitry.

6. The moving object detection device according to claim 5, comprising:

a second input circuitry that, in operation, receives vehicle information related to a move of the vehicle in time sequence, wherein the controller, in operation, transforms coordinate values of the previous detected first continuum object and the second continuum object into coordinate values that correspond to a coordinate system of coordinate values indicating the first continuum object of this time and the second continuum object on basis of the vehicle information received by the second input circuitry, and detects change in the shape of the end portion of the first continuum object of this time on basis of at least coordinate-transformed first coordinate values indicating the previous detected first continuum and second coordinate values indicating the first continuum of this time.

7. The moving object detection device according to claim 1, wherein when the controller determines that a width of the traveling road is smaller than a third threshold value, the controller processes the positional information received by the first input circuitry in time sequence.

8. A non-transitory computer-readable storage medium storing a program that causes a computer to execute:

a process of receiving positional information indicating a position of an object present around a vehicle in time sequence from a radar object detector included in the vehicle, the positional information including a plurality of reflection points reflected by at least part of the object, the plurality of reflection points respectively corresponding to a plurality of azimuth positions from the radar object detector; and a process of processing the positional information in time sequence including the plurality of reflection points included in the positional information, determining, based on the plurality of reflection points respectively corresponding to the plurality of azimuth positions from the radar object detector, a shape of an end portion of a detected first continuum object of this time is changed in comparison with a shape of an end portion of a previous detected first continuum object, and outputting information indicating that another moving object different from the vehicle is present to a vehicle control circuitry included in the vehicle.

* * * * *